United States Patent
Kondo

[15] 3,661,232
[45] May 9, 1972

[54] SPOT TYPE DISK BRAKE

[72] Inventor: Toshio Kondo, Hekikai, Japan

[73] Assignee: Aisin Seiki Kabushiki Kaisha, Kariya, Aich Pref., Japan

[22] Filed: Mar. 24, 1970

[21] Appl. No.: 22,331

[30] Foreign Application Priority Data

Mar. 29, 1969 Japan..................................44/26844

[52] U.S. Cl............................................188/73.4, 188/73.6
[51] Int. Cl........................................................F16d 65/20
[58] Field of Search ....................188/72.5, 73.3, 73.4, 73.6, 188/73.1, 73.5

[56] References Cited

UNITED STATES PATENTS

| 3,493,084 | 2/1970 | Maurice | 188/72.5 |
| 3,245,500 | 4/1966 | Hambling et al. | 188/73.4 X |

*Primary Examiner*—George E. A. Halvosa
*Attorney*—Pierce, Scheffler & Parker

[57] ABSTRACT

A spot type disk brake for wheels comprising a rotatable disk, two friction linings and backing plates secured thereto on mutually opposite flat sides of the disk, one of which is located between one of two pistons slidably fitted in a cylinder and the disk, two parallel pins for supporting the friction linings and backing plates, a reaction transfer plate engaged with the other piston and with a support member which abuts back to back the other backing plate whereby the worn out linings with the backing plates may be easily detached from the brake mechanism after removing the pins.

4 Claims, 6 Drawing Figures

PATENTED MAY 9 1972  3,661,232

INVENTOR.
Toshio Kondo

INVENTOR.
Toshio Kondo

SPOT TYPE DISK BRAKE

This invention relates to improvements in disk brakes of the kind in which friction linings are adapted to be brought into engagement with opposite faces of a rotatable disk by hydraulic actuating means.

In a conventional spot type disk brake, a hydraulic cylinder housing in which opposed pistons are slidably fitted is mounted in a stationary member mounted on a fixed part adjacent to one side of the disk, and one piston acts directly on a first friction lining with a backing plate fixed thereto located between the piston and the disk, while the other piston acts in the opposite direction on a reaction transfer plate or yoke which straddles the periphery of the disk and is adapted to urge a second friction lining with a backing plate fixed thereto into engagement with the opposite face of the disk. The friction linings and backing plates are supported by parallel pins fixed to the cylinder. As the friction linings are repeatedly driven into engagement with the rotatable disk in successive brake application, wear occurs on the lining. However, it is very difficult to replace the worn linings, especially the second lining, with new ones since the reaction transfer plate at one inner edge engages with the second backing plate and after drawing out the pins it is necessary to detach the second friction lining with backing plate from the reaction transfer plate in a limited, narrow space.

Therefore, the principal object of this invention is to overcome the above mentioned difficulty in the prior art by providing a reaction transfer plate supporting member which is disposed back to back with the second backing plate and includes projecting means for receiving the inner edge of the reaction transfer plate therein. Thence, without acting on the reaction transfer plate the friction linings may be removed from the brake mechanism after drawing out the parallel supporting pins.

Other objects will become apparent to those skilled in the art from the following description with reference to the accompanying drawings which depicts several embodiments of the invention for illustrative purposes only.

Figure 1:
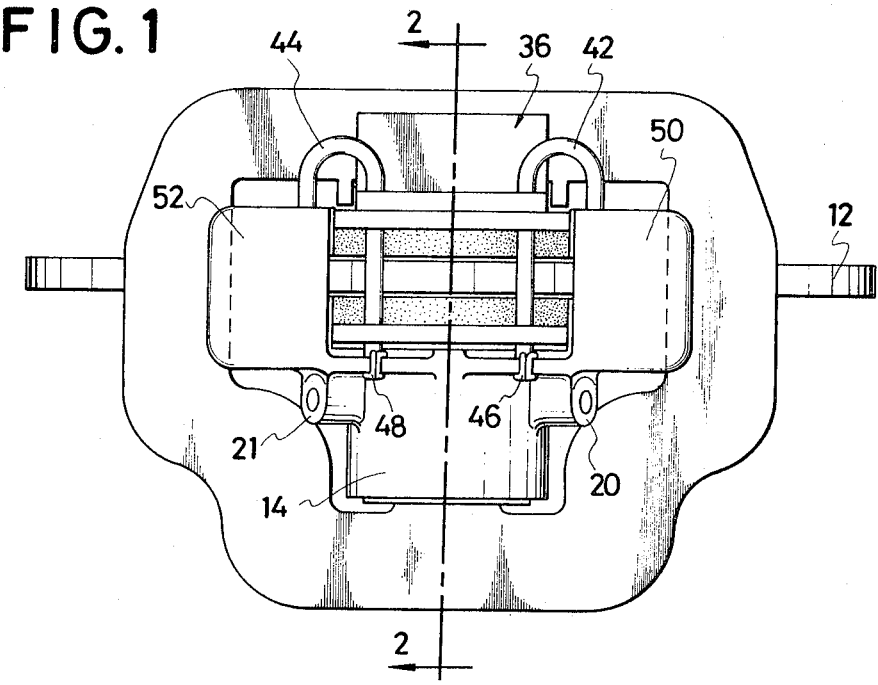
FIG. 1 is a plan view of a spot type disk brake.
Figure 2:
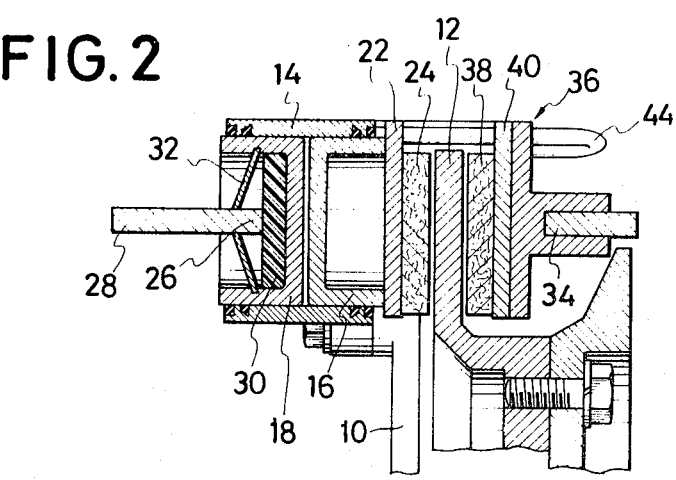
FIG. 2 is a view taken along section line 2—2 of FIG. 1.

In the brake illustrated in FIGS. 1 and 2 the stationary member 10 of the brake is disposed adjacent to one side of the brake disk 12. The member 10 incorporates a hydraulic cylinder housing 14 which is open at both ends of which the axis is substantially parallel to the axis of the disk 12. Within the cylinder, there are slidably and sealingly fitted two pistons 16 and 18. For urging the pistons apart, fluid under pressure from a master cylinder (not shown) is supplied to the space in the cylinder between the pistons through an inlet port 20. An outlet 21 for bleeding the cylinder is also provided. One piston 16 is directly engaged with a backing plate 22 of a first friction lining 24 confronting one flat surface of the disk, while the other piston 18 is engaged with one inner edge 26 of a reaction transfer plate 28 through a spacer or shim 30. A spring 32 is provided within the piston 18 for holding the inner edge 34 engaged with a reaction transfer plate supporting member 36 of this invention as will become more apparent hereinafter. Adjacent to the other flat surface of the rotatable disk 12, a second friction lining 38 is provided with a second backing plate 40 secured thereto which is disposed back to back with the support member 36. In outward extensions of the backing plates, there are provided slots (not shown) through which two parallel pins 42 and 44 are passed. One end of each pin is fixed to the cylinder housing 14 by clips 46 and 48 respectively which prevent axial escape of the pins, while the other ends thereof are outwardly turned to be fixed to two guide parts 50 and 52, respectively. The guide parts are formed integrally with the cylinder housing 14 and extend in a straddling manner over the brake disk from one side to the other side thereof. It will be apparent that torque on the friction linings 24 and 38 is taken by the guide parts and is not transfered to the reaction transfer plate 28 so that not much rigidity thereof is required, although there is no novelty in this point.

Figure 3:
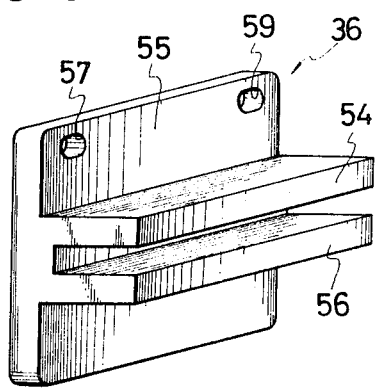
FIG. 3 is a perspective view of a support member.

The support member 36 is a rigid body and is provided for supporting the reaction transfer plate with a pair of projecting means 54 and 56 (FIG. 3) formed integrally with a main body 55 of the support member and which project away from the second friction lining and backing plate. In an outward extension of the support member 36 there are provided two slots 57 and 59 aligned with the slots in the backing plates through which the parallel pins are passed. Between the projections 54 and 56, the inner edge 34 of the reaction transfer plate 28 is inserted. It should be noted that the space between the two projections does not require close tolerances but rather need only prevent excessive rattling movement of the reaction transfer plate 28 during the vehicle operation.

In operation, when fluid under pressure is supplied to the cylinder housing 14 the friction lining 24 is applied to the adjacent face of the disk by the direct engagement of the piston 16 with the backing plate 22. At the same time the other piston 18 is moved in the opposite direction and acting on the reaction transfer plate moves the reaction transfer plate in a direction to apply to the opposite face of the disk the second friction lining 38 carried by the backing plate 40 through the support member 36. It should be recognized that the second lining 38 is worn evenly or substantially in parallel relationship with respect to the flat surface of the disk since the support member 36 distributes the load over a substantial area of the second backing plate 40.

When the friction linings are so worn that relining thereof is needed, the clips 46 and 48 may be detached from the pins, so that the parallel pins may be drawn out in an upward direction in FIG. 1. Thus the worn out linings may be easily exchanged without disturbing the reaction transfer plate.

Figure 4:
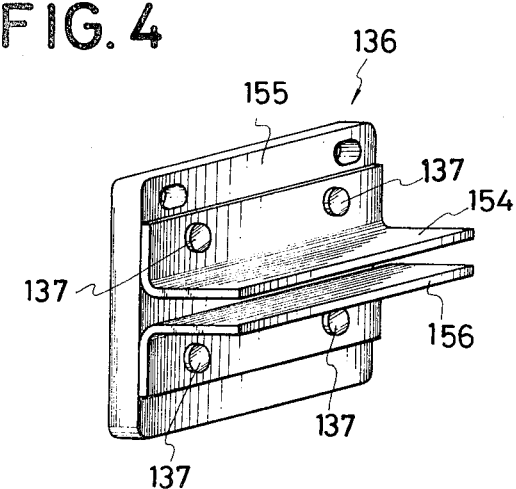
FIGS. 4 to 6 are views similar to FIG. 3 showing modifications of the support member.
Figure 5:
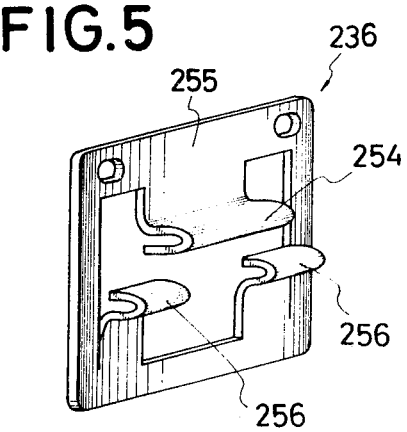
Figure 6:
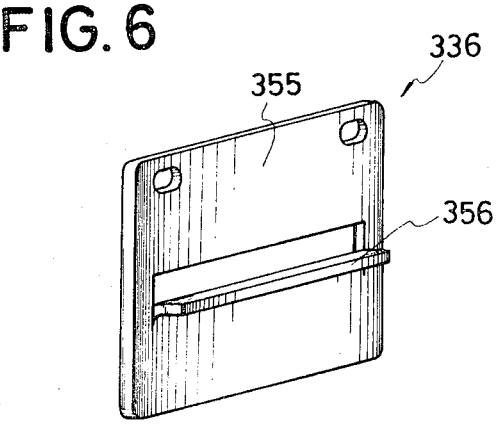

In FIGS. 4 to 6, modifications of the support member are shown. The support member 136 of FIG. 4 comprises a pair of substantially L-shaped plates 154 and 156 fixed, by means of rivets 137 to the main body 155 formed of a rigid material. Each L-shaped plate is of lesser thickness than the main body 155 so that the other inner edge of the reaction transfer plate is resiliently engaged therebetween, so that rattling movement of the reaction transfer plate may be substantially prevented. Other modified support members 236 and 336 as shown in FIGS. 5 and 6 have less thick main bodies 255 and 355 than the support member of the foregoing embodiments, and these members 236 and 336 are formed from one piece of material thus providing an economy of material cost. The support member 236 comprises an upper projection 254 and lower projections 256 formed on opposed sides thereof to resiliently engage the reaction transfer plate therebetween, and the remaining support member 336 has only one projection 356 which is bent down from the approximate middle portion of the main body 355 and is adapted to resiliently engage and urge the inner edge 34 of the reaction transfer plate upwardly.

In addition, it should be understood that for receiving the reaction transfer plate there may be provided a horizontal groove in the main body in place of the projecting means, and the inner edge 34 of the reaction transfer plate may be inserted within the groove.

I claim:

1. A spot type disc brake for a vehicle wheel comprising a brake disc rotatable with the wheel, hydraulic means provided with two members movable in opposed directions and located on one side of said brake disc, a first friction lining and backing plate secured thereto located on one side of said brake disc and actuated by one of said movable members, a second friction lining and backing plate secured thereto located on the other side of said brake disc, said backing plates being provided with slots therein, two parallel pins removably fixed to said hydraulic means and passing through said slots for supporting said backing plates and friction linings, a support member disposed back to back with said second backing plate and having slots aligned with the slots in said backing plates for receiving said pins therethrough for support by said pins, a reaction transfer plate actuated on one inner edge thereof by said other movable member, said support member including a main body bearing against said second backing plate and at least one projecting means for resiliently receiving the opposite inner edge of said reaction transfer plate, whereby when said pins are removed, said friction linings and backing plates may be removed without displacement of said reaction transfer plate.

2. A spot type disc brake as claimed in claim 1, wherein said at least one projecting means consists of a pair of resilient projections formed integrally with said main body.

3. A spot type disc brake as claimed in claim 1 wherein said at least one projecting means consists of a pair of resilient projections securely attached to the main body of said support member.

4. A spot type disc brake as claimed in claim 1 wherein said at least one projecting means consists of one resilient projection adapted to resiliently engage one side of the other opposite inner edge of said reaction transfer plate.

* * * * *